Sept. 4, 1956 T. S. KULKA 2,761,555

TAPE RETAINING MEANS FOR REELS

Filed Nov. 5, 1954 3 Sheets-Sheet 1

INVENTOR
THOMAS S. KULKA

BY Almon S. Nelson
ATTORNEY

Sept. 4, 1956 T. S. KULKA 2,761,555

TAPE RETAINING MEANS FOR REELS

Filed Nov. 5, 1954 3 Sheets-Sheet 2

INVENTOR

THOMAS S. KULKA

BY Elmer S. Nelson

ATTORNEY

Sept. 4, 1956 T. S. KULKA 2,761,555

TAPE RETAINING MEANS FOR REELS

Filed Nov. 5, 1954 3 Sheets-Sheet 3

INVENTOR
THOMAS S. KULKA

BY Almon S. Nelson
ATTORNEY

United States Patent Office 2,761,555

Patented Sept. 4, 1956

2,761,555

TAPE RETAINING MEANS FOR REELS

Thomas S. Kulka, Cleveland, Ohio

Application November 5, 1954, Serial No. 467,061

8 Claims. (Cl. 206—52)

Figure 1:
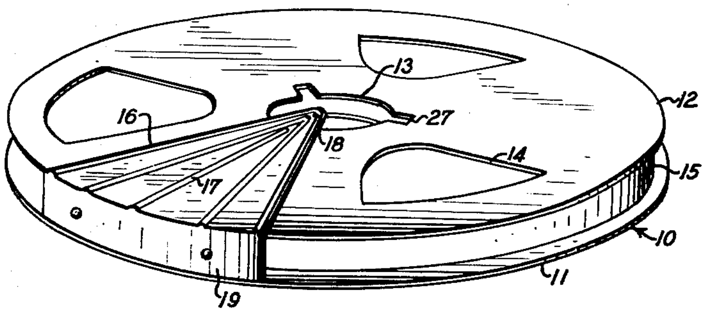

This invention relates to the storage and handling of material and more particularly to means for retaining tape, such as motion picture film or sound recording tape on a reel and preventing unwinding of the same. In certain forms, the retaining means also provides a protective cover for a portion of the reel.

Heretofore, numerous devices for retaining tape on a spool or reel have been utilized but many of these were cumbersome and difficult to use, were prone to slip and release the tape and in some instances required very careful manipulation in order to prevent damage to the tape.

In devices of this nature it is extremely important that the outside dimensions of the reel and tape, which in effect forms a package, should not be increased materially since such increased dimensions would adversely affect storage and transportation of the reels in containers provided therefore, and also retaining means contemplated by this invention should be relatively easy to apply and not susceptible to inadvertent displacement. It is also highly desirable that retaining means of the nature contemplated, should be formed of relatively lightweight, readily available materials and should be of such nature that they will not be easily damaged in such a manner to destroy their usefulness and efficiency.

Furthermore, in view of the fact that reels of the type utilized to receive and store motion picture film or sound recording type are commonly formed of relatively thin, lightweight metal or plastic, the flanges of the reel are relatively flexible and, consequently, cannot be depended upon to provide an anchorage for tape retaining means. Since the hub through which the spindle hole extends and the portion of the flanges of the reel surrounding the hub is the only relatively rigid part of the reel, it is highly desirable that any tape retaining means be anchored to this portion of the reel.

It is accordingly an object of the invention to provide a tape retaining means for reels which is of lightweight economical construction and which may be applied to a reel to retain the tape thereon without materially increasing the overall dimensions or weight of the reel.

A further object of the invention is the provision of a tape retaining means for reels which may be economically manufactured from readily available materials by relatively simple stamping or molding operations.

A still further object of the invention is the provision of a tape retaining means for reels which may be conveniently applied to and removed from such reels without danger of damaging the tape or the reel.

Another object of the invention is the provision of a tape retaining means for reels which utilizes a substantially rigid part of such reel for maintaining the retaining means in place.

A further object of the invention is the provision of a tape retaining means for reels which will automatically compensate for variations in diameter or length of the tape on such reel.

A still further object of the invention is the provision of a tape retaining means for reels which is not easily damaged to an extent impairing its usefulness.

Another object of the invention is the provision of a tape retaining means for reels which also provides a support for the flanges of the reel.

A further object of the invention is the provision of a tape retaining means for reels which partially encloses and protects such reel.

Figure 17:
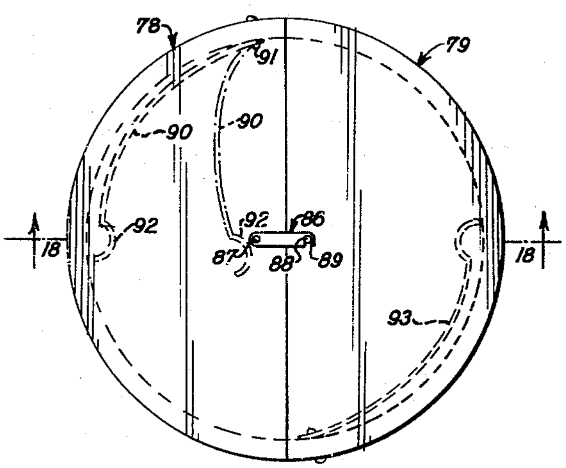
Figure 18:
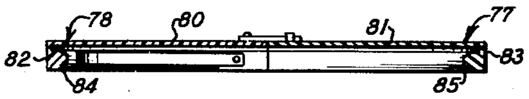
Figure 2:
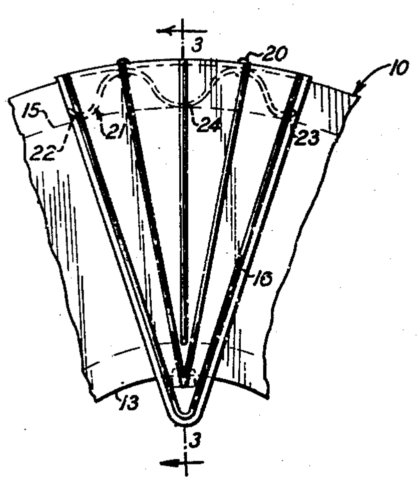
Figure 4:
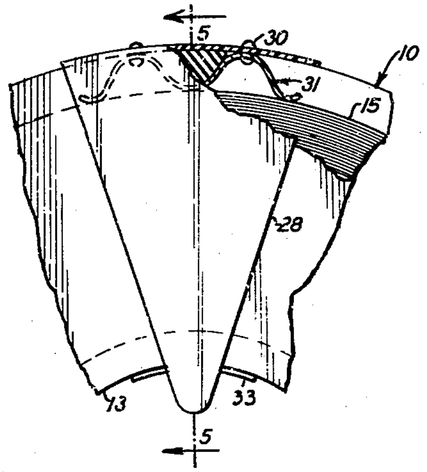
Figure 3:
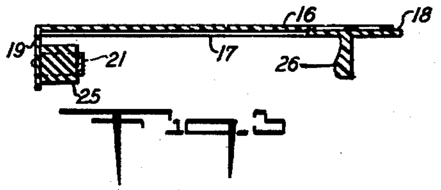
Figure 5:
Figures 6, 7:
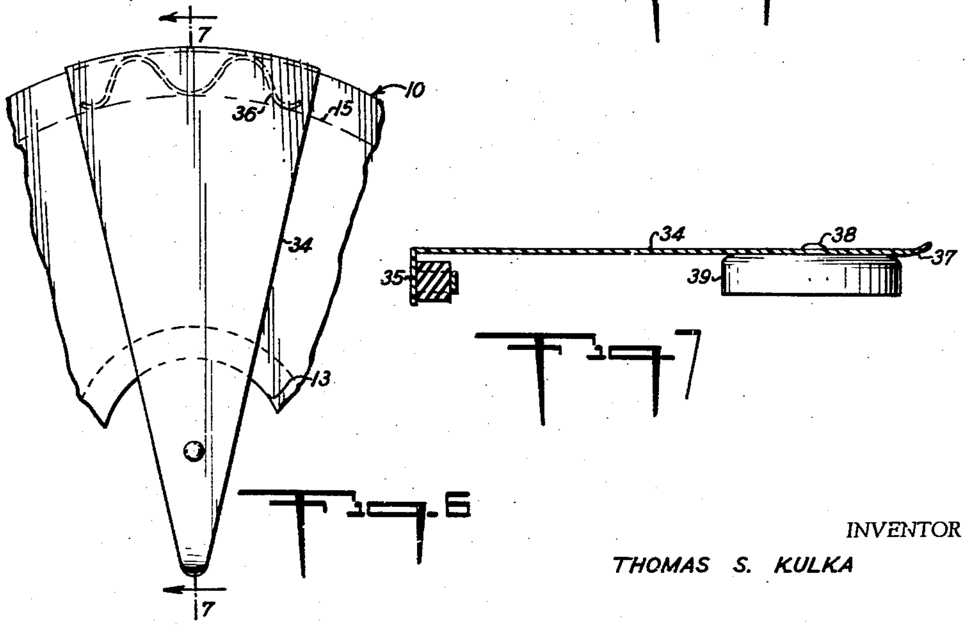
Figures 8, 9, 10, 11, 12, 13, 14, 15, 16:
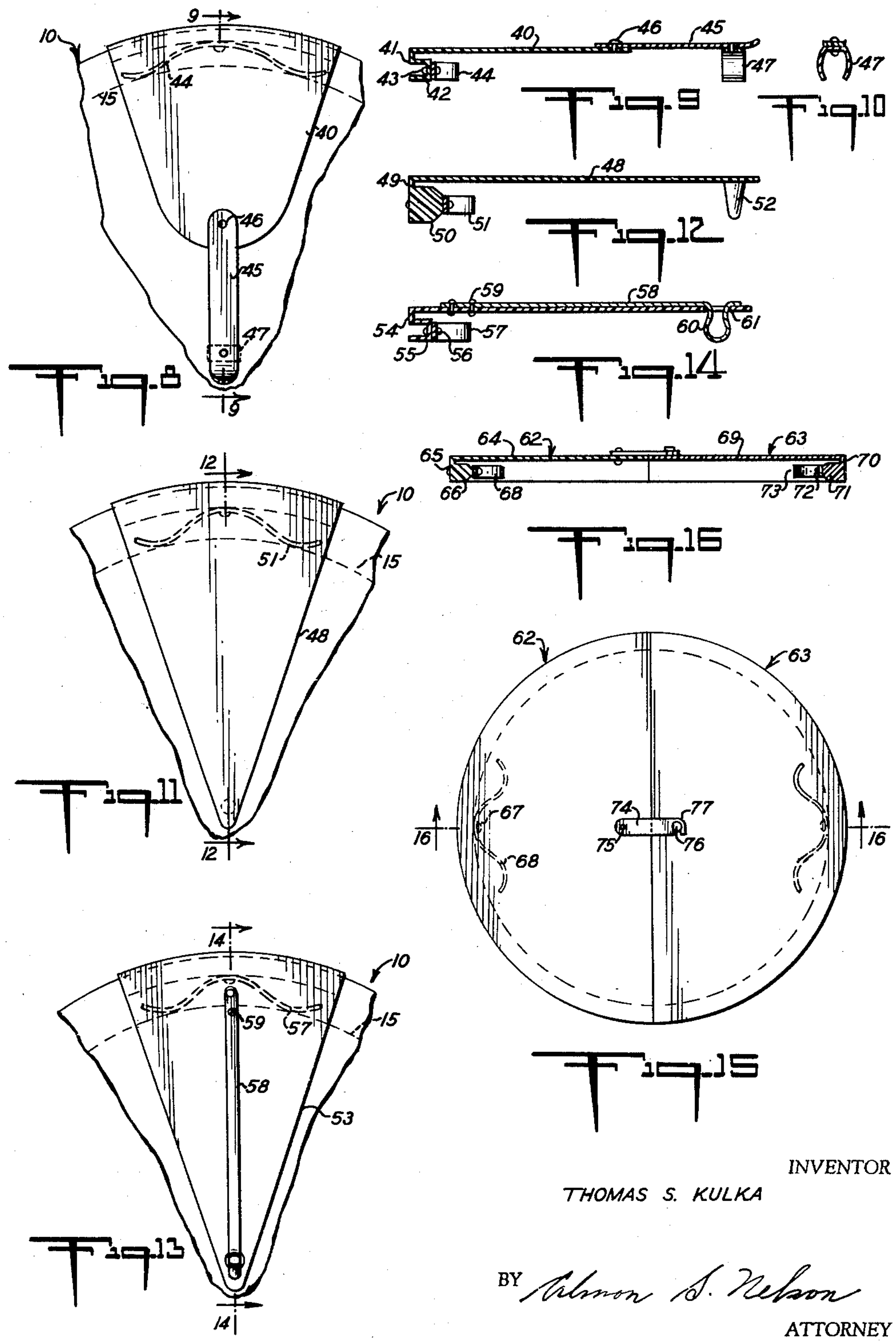

Further objects and advantages of the invention will be apparent from the following description taken in conjunction with the accompanying drawing wherein:

Fig. 1 is a perspective view of a reel with tape wound thereon and with one form of tape retaining means applied thereto;

Fig. 2, a fragmentary top plan view of the tape retaining means as shown in Fig. 1;

Fig. 3, a sectional view on the line 3—3 of Fig. 2;

Fig. 4, a fragmentary top plan view of a modified form of tape retaining means in place on the reel;

Fig. 5, a sectional view on the line 5—5 of Fig. 4;

Fig. 6, a fragmentary top plan view of a further modified form of tape retaining means in place on the reel;

Fig. 7, a sectional view on the line 7—7 of Fig. 6;

Fig. 8, a fragmentary top plan view of a still further modified form of tape retaining means in place on the reel;

Fig. 9, a sectional view on the line 9—9 of Fig. 8;

Fig. 10, a side elevational view of the tape retaining means shown in Fig. 9 and showing particularly the formation of the clip for engaging the portions of the reel to hold the retaining means in place;

Fig. 11, a fragmentary top plan view of another modified form of tape retaining means in place on the reel;

Fig. 12, a sectional view on the line 12—12 of Fig. 11;

Fig. 13, a fragmentary top plan view of still another modified form of tape retaining means in place on the reel;

Fig. 14, a sectional view on the line 14—14 of Fig. 13;

Fig. 15, a top plan view of a modified form of tape retaining means for partially enclosing the tape receiving reel;

Fig. 16, a sectional view on the line 16—16 of Fig. 15;

Fig. 17, a top plan view similar to Fig. 15, but showing a modified form of tape retaining spring; and Fig. 18, a sectional view on the line 18—18 of Fig. 17.

With continued reference to the drawing there is shown in Fig. 1, a conventional reel 10 for receiving motion picture film, sound recording tape or tape of any other nature. These reels are commonly made of lightweight metal, plastic or the like and are, of course, available in different diameters to accommodate different lengths of tape. As shown in Fig. 1, the reel 10 may well comprise spaced substantially parallel flanges 11 and 12 connected at the center by a hub portion, not shown, through which extends a spindle receiving aperture 13. In order to decrease the weight of the reels, portions of the flanges 11 and 12 are frequently removed to provide openings 14. Obviously the flanges 11 and 12 are relatively flexible and serve only to retain the tape 15 therebetween. A tape retaining means, as shown in Figs. 1 to 3, may be manufactured of metal or suitable plastic and may well comprise a relatively flat, elongated wedge-shaped body 16 provided with spaced longitudinally disposed strengthening ribs 17. The length of the body 16 may be slightly less than the radius of the reel 10 and the inner end of such body 16 is relatively narrow and rounded as shown at 18, while the outer end thereof is relatively wide and is provided with an integral, angularly disposed arcuate member 19, having a curvature substantially the same as the curvature of the flanges 11 and 12 of the reel 10. The width of the member 19 is substantially equal to the distance between the flanges 11 and 12 of the reel 10.

Secured to the angular member 19 by suitable fastening means, such as rivets or the like 20, and disposed on the inner side of the member 19 is a tape engaging and retaining member 21 which may take the form of a corrugated spring formed of suitable metal, plastic or other material. The spring 21 may be provided with curved end portions 22 and 23 and an intermediate portion 24, which portions serve to yieldably engage the outer surface of the tape 15 wound on the reel 10 between the flanges 11 and 12. Secured to the angular member 19, by a suitable adhesive or other means, is a mass of yieldable material 25 which may be conveniently formed of sponge rubber or the like, this mass 25 constituting a flange supporting member, the thickness of which is substantially equal to the distance between the flanges 11 and 12 of the reel 10. The flange retaining member 25 may be disposed between the corrugations of the tape engaging spring 21 and may extend laterally thereof on both sides.

As shown in Fig. 3, the body 16 may be provided adjacent the inner end 18 with a locking means 26 in the form of a half round peg or the like projecting from the body 16 and intended to secure the tape retaining means in place on the reel 10 by engaging in a notch 27 provided in the central portion of the flanges 11 and 12 of the reel 10. The peg 26 is compressible and is intended to frictionally engage the walls of one of the notches 27 in order to releasably secure the tape retaining means in place on the reel 10.

In use, and assuming that a tape 15 is wound on the reel 10 between the flanges 11 and 12, the body of the tape retainer is manipulated to dispose the tape engaging spring 21 and the flange supporting member 25 between the flanges 11 and 12, and the body 16 is moved radially inwardly of the reel 10 until the portions 22, 23 and 24 of the spring 21 engage the outer surface of the tape 15, whereupon further inward radial movement of the body 16 will serve to compress the spring 21 and if necessary, the member 25, to firmly engage the outer surface of the tape 15, whereupon the locking peg 26 may be disposed in a notch 27 in the reel 10, thus securely holding the tape retaining means in place thereon. At the same time, of course, the flange supporting member 25 is disposed between the flanges 11 and 12 and will engage the inner surfaces thereof to prevent undue movement toward each other, which might tend to damage the tape 15 which is disposed therebetween. The tape retaining means may be easily removed from the reel by merely removing the peg 26 from the notch 27, whereupon the spring 21 and flange supporting member 25 may be removed from between the flanges 11 and 12, thus leaving the tape 15 free to unwind from the reel 10.

The modified form of tape retaining means shown in Figs. 4 and 5 is very similar to that above described and may well comprise a body 28 of generally wedge-shaped formation, provided at its outer end with an angularly disposed member 29 to the inner surface of which is secured by suitable fastening means, such as rivets 30, a tape engaging spring 31 formed similarly to the spring 21, described above in connection with the first form of the invention. Also secured to the member 29 is a yieldable flange supporting member 32 which is similar in every respect to the flange supporting member 25, described above. In this form of the invention, the tape retaining means is secured in place on the reel 10 by an arcuate extension 33 depending from a surface of the body 28 and engaging a wall of the spindle receiving aperture 13 in the reel 10. In this form of the invention the retaining member 33 is urged into engagement with the wall of the spindle receiving aperture 13 by the engagement of the spring 31 with the surface of the tape 15, wound on the reel 10. This form of tape retaining means is applied to and removed from the reel 10 in the same manner as that described above, in connection with Figs. 1 to 3.

A tape retainer having a further modified means for securing the same to the reel 10 is shown in Figs. 6 and 7, and this retainer may well comprise a wedge-shaped elongated body 34 having an overhanging lip 35 to which is secured a tape engaging spring 36 formed in the same manner as the tape engaging springs described above. Secured to the body 34 adjacent the inner end 37 thereof by suitable fastening means such as a rivet 38 is an inverted cup-shaped securing member 39 having an outside diameter substantially equal to the diameter of the spindle receiving aperture 13 in the reel 10. As shown in Fig. 6, this form of retaining means is applied to the reel in the same manner as those described above and with the cup-shaped member 39 removably received in the spindle receiving aperture 13. It is understood that the cup-shaped member 39 will have a reasonably tight press fit in the aperture 13, thus holding the tape retaining member 34 securely in place with the spring 36 engaging the tape 15 and the retaining means may be removed simply by lifting the cup-shaped member 39 from the spindle receiving aperture 13, as described above in connection with the other forms of the invention.

A somewhat different form of tape retaining means is shown in Figs. 8, 9 and 10, wherein a wedge-shaped body member 40 is provided at its outer end with an angularly disposed lip 41 which in turn is formed as a channel in cross-section with the portion 42 underlying the body 40. The width or thickness of the portion 42 is substantially equal to the distance between the flanges 11 and 12 of the reel 10 and, when applied to the reel, this portion 42 extends between such flanges and provides a support therefor. Secured to the channel portion 42 of the lip 41 by suitable fastening means, such as a rivet 43, is a tape engaging spring 44, which as shown in Fig. 8, engages the outer surface of tape 15 in much the same manner as the tape engaging springs described above.

The body 40 may be made of plastic, metal or any other suitable material and is relatively rigid. In order to removably secure the body 40 to the reel 10 there is provided an elongated relatively flexible member 45 secured to the body 40 adjacent the inner end thereof by any suitable fastening means, such as a rivet 46. The member 45 has secured thereto adjacent the inner end thereof a U-shaped resilient clip 47 which is adapted to be releasably retained either in the spindle receiving aperture of the reel 10 or in one of the notches 27, depending upon the location of the clip 47. Obviously, the clip 47 must be made of the proper size to snugly fit within either the spindle receiving aperture 13 or a notch 27, as desired.

In the application and removal of this form of retaining means to the reel 10, the body 40 and tape engaging spring 44 are moved radially inwardly of the reel 10 until the spring 44 engages the tape 15 whereupon the clip 47 may be pressed into either the spindle receiving aperture 13 or one of the notches 27 to securely hold the retaining means in place on the reel. Removal of the retaining means is accomplished by withdrawing the clip 47 from the aperture 13 or notch 27 thereafter moving the body 40 and spring 44 radially outwardly of the reel 10 until the same is detached therefrom.

A further modified form of tape retaining means is shown in Figs. 11 and 12, wherein a wedge-shaped body 48 having an angularly disposed clip 49, provided with an inwardly extending flange engaging and supporting member 50, may be molded as a single piece from plastic or other suitable material. Secured to the inner surface of the member 50 is a tape engaging spring 51 which, as shown in Fig. 11, is intended to engage the surface of tape 15 wound on the reel 10. The opposite end of body 48 is provided with a tapered integral peg 52 which is intended to frictionally engage either the spindle receiving aperture 13 or one of the notches 27 in the reel 10. In this form of the invention, the body 48 is relatively rigid and is applied to the reel 10 by moving the same radially inwardly of such reel until the spring 51 and portion or member 50 move into the space between the flanges 11 and 12 and with the spring 51 engaging the tape 15, at which time, the peg 52 may be forced into either the aperture 13 or a notch 27 to hold the body 48 in place on the reel 10. Removal of this retaining means is accomplished by removing the peg 52 and moving the body 48 radially outwardly of the reel 10.

The body 53 of Figs. 13 and 14 is substantially the same wedge-shaped member as described above, and such body is provided with an angularly disposed lip 54 and an inwardly extending portion 55 of channel shape and providing a support for the flanges 11 and 12 of the reel 10. Secured to the portion 55 by a rivet 56 or other suitable fastening means is a tape engaging spring 57. As shown in Fig. 13, the spring 57 engages the tape 15 on the reel 10 in the same manner as the springs described above.

In this form of the invention, the body 53 is relatively rigid and in order to secure the same on the reel 10 there is provided an elongated strap 58 which is resilient or yieldable and may be formed of suitable material, such as metal, this strap 58 being secured to the body 53 by rivets or other suitable fastening means 59. The strap 58 extends lengthwise of the body 53 for substantially the entire length thereof and is provided at its inner end with a U-shaped resilient peg 60 which, in the position shown in Figs. 13 and 14, projects through an aperture 61 in the body 53 adjacent the inner end thereof. The resilient peg 60 is intended to frictionally engage in either the spindle receiving aperture 13 or one of the notches 27 in the reel 10 and when applying the retaining means of this form of the invention to the reel 10, the body 53 would be moved radially inwardly of the reel until the spring 57 engages the tape 15 and during such movement, it is to be presumed that the peg 60 will be moved upwardly in the aperture 61 to permit free movement of the body 53 over a flange of the reel 10. With the body 53 in proper position, the peg 60 will then move downwardly through the aperture 61 and into frictional engagement with either the spindle receiving aperture 13 or a notch 27 in the reel 10 to securely hold the tape retaining means in position thereon. Removal of the same is accomplished by lifting the strap 58 and peg 60 from engagement with the aperture 13 or notch 27, whereupon the body 53 may be moved radially outwardly of the reel and away therefrom.

A quite different form of tape retaining means is shown in Figs. 15 and 16, and this form of the invention may well include two substantially semi-circular members 62 and 63 which, when assembled together have an outer diameter slightly larger than the outer diameter of the reel 10. The semi-circular member 62 is provided with a flat outer wall 64 and a semi-circular flange 65 having an inwardly extending semi-circular rib 66 adapted to be received between the flanges 11 and 12 of the reel 10. Secured to the rib 66 by any suitable fastening means, such as a rivet 67, is a tape engaging spring 68. The semi-circular member 63 is likewise, provided with a flat outer wall 69 having a semi-circular flange 70 provided with an inwardly extending semi-circular rib 71 adapted to be received between the flanges 11 and 12 of the reel 10. Secured to the inner surface of the rib 71 by any suitable fastening means, such as a rivet 72, is a tape engaging spring 73. The wall 64 of the semi-circular member 62 is provided with a latch bar 74 pivotally mounted on the wall 64 by any suitable means, such as a rivet 75. The latch bar 74 is provided at its opposite end 77 with a notch, which, in latching position, engages a pin 76 secured to the wall 69 of the semi-circular member 63.

In use the tape retaining means of this form of the invention is applied to the reel 10 by moving each semi-circular member 62 and 63 radially inwardly of the reel until the springs 68 and 73 engage the tape 15 received thereon, and the ribs 66 and 71 pass between the flanges 11 and 12. As soon as the inner edges of the walls 64 and 69 and the inner edges of the flanges 65 and 70 together with the ribs 66 and 71 abut each other, the latch bar 74 may be moved to bring the notch into engagement with the pin 76, at which time the two semi-circular members 62 and 63 will be securely locked together on the reel 10. Thus, a unitary package is provided in which a portion of the reel including the tape is completely covered by the retaining means, thus securely retaining the tape in place on the reel 10 and protecting the same from dust or damage. The retaining means may be conveniently removed from the reel 10 by merely releasing the latch bar 74 from the pin 76, at which time the two semi-circular members 62 and 63 may be moved apart and removed from the reel 10.

The form of the invention shown in Figs. 17 and 18 is very similar to that described above in connection with Figs. 15 and 16, the main difference being in the tape engaging springs. In this form of the invention, two semi-circular members 78 and 79 are provided and these members include outer flat walls 80 and 81 and semi-circular flanges 82 and 83 provided with inwardly extending semi-circular ribs 84 and 85 for engagement between the flanges 11 and 12 of the reel 10. Likewise, the semi-circular members 78 and 79 are provided with a latch bar 86 pivotally mounted at 87 on the semi-circular member 78 and a latching pin 88 secured to the semi-circular member 79 and adapted to engage a notch 89 in the latch bar 86 when the retaining means is in closed position on the reel 10.

In this form of the invention, an elongated tape engaging spring 90 is secured at one end thereof by suitable fastening means, such as a rivet 91, to the inner surface of semi-circular rib 84. The opposite end of the spring 90 is curved, as at 92, and in the absence of tape on the reel 10, the spring 90 and end 92 would be disposed substantially in the inner dotted line position shown in Fig. 17. When on the reel and engaging tape wound thereon, the position of the spring 90 and end 92 would be at a location depending upon the amount of tape on the reel 10, but if such reel were full, the position would be substantially that shown at the outer dotted line position of Fig. 17. A similar tape engaging spring 93 is also provided on the other semi-circular member 79 and operates in the same manner as the spring 90 above described.

It will be understood, of course, that the ribs 84 and 85 of the semi-circular casings 88 and 89 may be either integral with the top portions of the casings or may be separately attached to the semi-circular flanges 82 and 83, respectively.

Referring now to the different forms shown in Figs. 1–14, inclusive, here it is to be understood that the retaining spring, that is, the corrugated spring which engages the tape, preferably functions independently of the means for retaining the clip to the reel. For example, in Fig. 3 of the drawings, the retaining spring 21 may be extremely resilient and is so constructed in most cases as to provide a very light pressure against the tape. This is due to the fact that heavy pressure may indent the tape and cause disturbances in reproduction. In order therefore that the clip be retained in place, the peg 26 should be designed to have a tight press fit with the aperture in the hub. Stated in another manner, the distance between the arcuate flange 19 and the peg 26 is substantially equal to the distance between the edge of the reel flange and the peripheral edge of the aperture which is engaged by the peg 26. In this way the design and resilience of the peg 26, coupled with the right angular arcuate flange 19, securely fastens the retaining member or clip to the reel regardless of the amount of pressure exerted by the retaining spring 21.

Thus, it will be seen that the arcuate flange 19 has a dual function, namely, as an anchor for the locking peg 26 and also as a base for the independently mounted retaining spring 21.

It will be seen that the invention in its various forms, as described above, provides a very simple and relatively inexpensive, yet highly efficient and easily usable, device for retaining a tape in position on a reel. Due to the nature of the device, the tape is only engaged by smooth or yieldable surfaces which effectively prevents damage thereto and furthermore, the device is so constructed as to firmly retain the tape in place regardless of small variations in diameter. Furthermore, it is to be noted that the device cooperates with a relatively rigid part of the reel and thereby is retained in position against inadvertent displacement.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. For use on tape receiving reels having side flanges, tape retaining means comprising two semi-circular members having flat side walls and semi-circular flanges, flange engaging and supporting means comprising an inwardly extending semi-circular rib on each semi-circular flange, yieldable tape engaging means comprising a corrugated spring secured to each rib whereby said semi-circular members may enclose one side and the circumference of said reel with said ribs disposed between the flanges of said reel and with said springs engaging tape wound on said reel, said semi-circular members being retained on said reel by engagement of said pin in said notch.

2. For use on tape receiving reels having side flanges, tape retaining means comprising two semi-circular members having flat side walls and semi-circular flanges, reel flange engaging and supporting means comprising an inwardly extending semi-circular rib on each semi-circular flange, yieldable tape engaging means comprising springs secured to each rib whereby said semi-circular members may enclose one side and the circumference of said reel with said ribs disposed between the flanges of said reel and with said springs engaging the tape wound on said reel, said semi-circular members being retained on said reel by engagement of said rib between said reel flanges.

3. For use on tape receiving reels having side flanges, tape retaining means comprising two semi-circular members having side walls and semi-circular flanges, flange engaging and supporting means comprising an inwardly extending semi-circular rib on each semi-circular flange, yieldable tape engaging means secured to each rib whereby said semi-circular members may enclose one side and the circumference of said reel with said ribs disposed between the flanges of said reel and with said yieldable means engaging tape wound on said reel, said semi-circular members being retained on said reel by engagement of said rib between said reel flanges.

4. For use on tape receiving reels having side flanges, tape retaining means comprising two semi-circular members having side walls and semi-circular flanges, reel flange engaging and supporting means comprising an inwardly extending semi-circular rib on each semi-circular flange, yieldable tape engaging means secured to each rib whereby said semi-circular members may enclose one side and the circumference of said reel with said ribs disposed between the flanges of said reel and with said yieldable means engaging tape wound on said reel, said semi-circular members being retained on said reel by said ribs.

5. A device as defined in claim 4 in which said tape engaging means comprises an elongated spring secured to each rib adjacent one end of said spring, the opposite end of each spring being curved, said curved ends being disposed in opposed alignment and being movable from a position adjacent the center of each semi-circular member to a position adjacent the inner surface of each rib.

6. A device as defined in claim 4 in which said tape engaging means comprises an elongated resilient member secured to each rib adjacent one end of said resilient member, the opposite end of each resilient member being curved, said curved ends being disposed in opposed alignment and being movable from a position adjacent the center of each semi-circular member to a position adjacent the inner surface of each rib.

7. For use on tape receiving reels having parallel side flanges, tape retaining means comprising two semi-circular members having flat side walls and semi-circular flanges attached thereto and extending at right angles therefrom; reel flange engaging and supporting means secured to said semi-circular flanges comprising ribs extending radially inward thereof, yieldable tape engaging means secured to one of said ribs whereby said semi-circular members when applied to said tape receiving reel may be retained thereon and will enclose one side and the circumference of said tape receiving reel with said ribs disposed between the flanges of said reel and with said yieldable means engaging the tape on said reel.

8. A device as defined in claim 7 wherein said ribs are formed of resilient material.

References Cited in the file of this patent

UNITED STATES PATENTS

| | | |
|---|---|---|
| 137,297 | Deitzler | Apr. 1, 1873 |
| 564,070 | Hartman | July 14, 1896 |
| 947,996 | Riley | Feb. 1, 1910 |
| 1,794,280 | Denniss et al. | Feb. 24, 1931 |
| 2,273,701 | Funke | Feb. 17, 1942 |
| 2,330,278 | Gordon | Sept. 28, 1943 |
| 2,626,705 | Ash | Jan. 27, 1953 |

FOREIGN PATENTS

| | | |
|---|---|---|
| 13,763 | Great Britain | Oct. 11, 1887 |
| 66,753 | Austria | Oct. 10, 1914 |
| 239,595 | Great Britain | Sept. 11, 1925 |
| 265,534 | Switzerland | Mar. 1, 1950 |